Dec. 5, 1961 C. E. JOHANSON ET AL Re. 25,093
SENSITIVE SPEED INSTRUMENT FOR AIRCRAFT
Original Filed Oct. 16, 1958
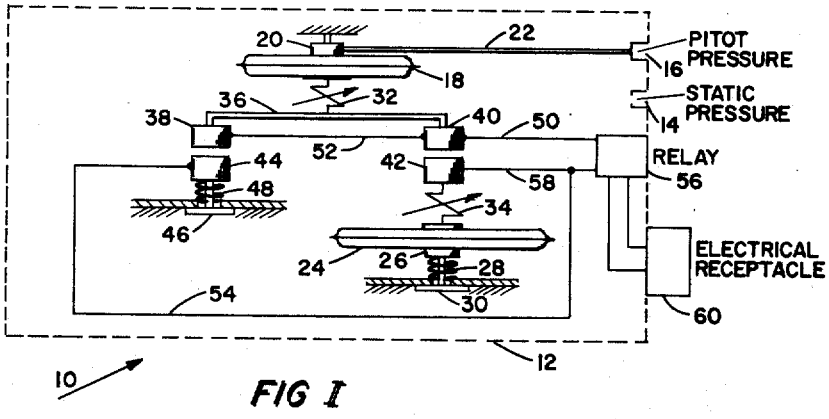
FIG I
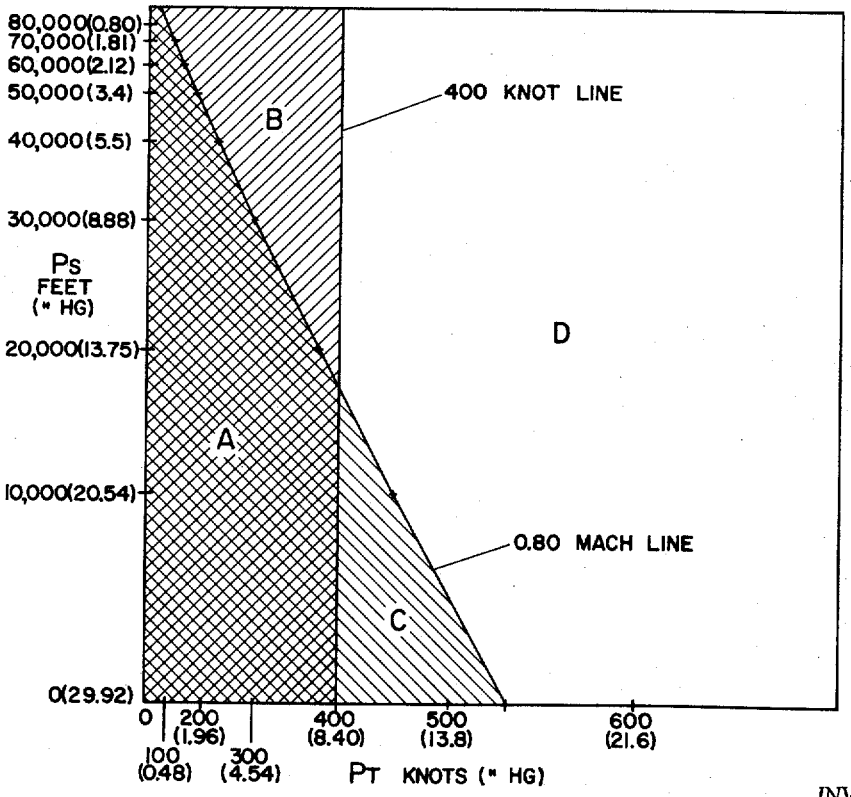
FIG II
INVENTORS
CARL E. JOHANSON
ALAN A. LORENZ
BY George A. Grater
ATTORNEY United States Patent Office Re. 25,093
Reissued Dec. 5, 1961

25,093
SENSITIVE SPEED INSTRUMENT FOR AIRCRAFT

Carl E. Johanson and Alan A. Lorenz, both of Davenport, Iowa, assignors to The Bendix Corporation, a corporation of Delaware Original No. 2,972,028, dated Feb. 14, 1961, Ser. No. 767,685, Oct. 16, 1958. Application for reissue June 19, 1961, Ser. No. 120,135
9 Claims. (Cl. 200—81.4)

Matter enclosed in heavy brackets [ ] appears in the original patent but forms no part of this reissue specification; matter printed in italics indicates the additions made by reissue.

The present invention relates to a sensitive speed instrument for aircraft and more particularly to a warning device which will provide a signal when a predetermined maximum safe airspeed and/or Mach number has been reached by the aircraft.

Various types of instruments are used to warn the pilot of an aircraft when the maximum safe speed of the craft has been reached. These instruments have primarily been dial indicating instruments in which combinations of pointers and indexes are used to indicate the maximum safe speed when such speed has been reached. In using these instruments the pilot would gather the facts and draw his conclusion. With the advent of high performance aircraft it has become more necessary to relieve the pilot of as many tasks in flying the aircraft as possible and to minimize the human error factor. An instrument in which a conclusion is given the pilot will aid the pilot in the safe flight of his aircraft. An object of the present invention is to provide an instrument which does not require the pilot's visual attention but one in which the conclusion desired is obtained on an audible signal or a visual signal. The invention is designed to provide a signal which will inform the pilot when the maximum safe speed or maximum preset speed of the craft has been reached and to thus overcome the deficiencies of the present indicating instruments. The maximum safe speed of an aircraft is a speed under which structural fatigue of an aircraft will not occur and maximum preset speed is any speed of the aircraft at which a visual or audible signal is desired.

There are several speed designations which are used to represent the speed of an aircraft, such as: indicated airspeed, true airspeed, equivalent airspeed and Mach number. Each of these designations of speed can also be used for indicating the maximum safe speed of an aircraft. Present methods generally call for using only one such speed designation in indicating maximum safe speed. With the advance in the performance of aircraft an instrument indicating maximum safe speed in at least two speed designations may be necessary for the safe flight of the aircraft.

The speed at which an aircraft may safely operate without causing a structural failure of the craft is dependent upon the structural design of the aircraft. The airframe manufacturer will determine the maximum safe speed and present the speed limitation in terms of an airspeed and/or Mach number. Because of the wide range of altitudes which aircraft now operate, an indicator which will only give a safe airspeed or Mach number will not safely define the operational limits of the aircraft. While changing altitude and holding airspeed constant, Mach number will vary substantially and conversely, while changing altitude and holding Mach number constant, airspeed will vary substantially.

An object of the present invention is to provide a sensitive warning instrument for aircraft which will provide an electrical signal when the aircraft reaches a predetermined speed.

Another object of the present invention is to provide a sensitive Mach-airspeed warning device for aircraft which will transmit an electrical signal when the aircraft reaches either a predetermined Mach number and/or airspeed, whichever is reached first.

A further object of the present invention is to provide a sensitive Mach-airspeed warning device in which means are provided to allow variations in the preset of the maximum Mach number and airspeed, which will permit the same instrument to be used in various types of aircraft.

A further object of the present invention is to provide a sensitive Mach-airspeed warning device for aircraft which will transmit an electrical signal when the maximum safe airspeed or Mach number for the particular aircraft has been reached.

The foregoing and other objects and advantages of the invention will appear more fully hereinafter from a consideration of the detailed description which follows, taken together with the accompanying drawing wherein an embodiment of the invention is illustrated. It is to be expressly understood, however, that the drawing is for the purpose of illustration and description and is not to be construed as defining the limits of the invention.

In the drawings:

FIGURE I is a schematic diagram of one embodiment of the invention.

FIGURE II is a graph showing the safe speed limits for a representative aircraft in terms of the criteria indicated airspeed and Mach number.

The following two tables show the need for an indicating device which can be used to indicate maximum safe indicated airspeed and Mach number. Table I indicates that with a constant Mach number the indicated airspeed varies substantially when there is an altitude variation. Thus, an indicator which would be used to indicate only maximum Mach number is not satisfactory where the aircraft's structural limits are also defined by a particular maximum safe indicated airspeed. Table II presents a reverse situation; where the indicated airspeed is held constant, the Mach number varies substantially with variations in altitude. Thus, an indicator which would be used to indicate only maximum indicated airspeed is not satisfactory where the aircraft's structural limits are also defined by a particular maximum safe Mach number.

TABLE I

AT CONSTANT MACH NUMBER

| Altitude, feet | Mach No. | Indicated Airspeed, Knots |
|---|---|---|
| 0 | 0.80 | 528 |
| 20,000 | 0.80 | 372 |
| 40,000 | 0.80 | 242 |
| 60,000 | 0.80 | 151 |
| 80,000 | 0.80 | 94 |

TABLE II

AT CONSTANT INDICATED AIRSPEED

| Altitude, feet | Indicated Airspeed knots | Mach No. |
|---|---|---|
| 0 | 400 | .605 |
| 20,000 | 400 | .854 |
| 40,000 | 400 | 1.237 |
| 60,000 | 400 | 1.863 |
| 80,000 | 400 | 2.909 |

The values for Tables I and II were taken from volume I of "Tables and Data for Computing Airspeeds, Altitudes and Mach Numbers Based on the WADC 1952 Model Atmosphere."

The tables demonstrate the inadequacy of a speed indicator which would indicate only maximum Mach number or indicated airspeed where the structural limits of the aircraft are limited by both. For example, in Table I, if the maximum safe Mach number for a craft is 0.80 Mach and the maximum safe indicated airspeed is 372 knots, then an aircraft which flies at the permitted 0.80 Mach, but has altitude below 20,000 feet is flying at a speed which is beyond the safe speed for the aircraft. A similar example may also be shown by Table II; if the maximum safe indicated airspeed for a craft is 400 knots and the maximum safe Mach number is 0.854, then an aircraft which flies the permitted 400 knots, but has altitude above 20,000 feet is flying at a speed which is beyond the safe speed for the craft.

Referring now to the drawing, and in particular to FIGURE I, there is shown a Mach-airspeed device 10 designed for use as a warning device when an aircraft has reached a predetermined airspeed and/or Mach number. The Mach-airspeed warning device 10 has a hermetically sealed housing 12 having two inlet ports 14 and 16. Static pressure inlet port 14 permits the pressure inside the hermetically sealed housing 12 to be equal that of the ambient air outside the aircraft. Total or Pitot pressure inlet port 16 permits the connecting of a pressure responsive device inside the hermetically sealed housing to a Pitot pressure line which transmits the aircraft's impact pressure.

A first fluid pressure responsive element such as capsule 18 (airspeed diaphragm) has one side rigidly mounted relative to the hermetically sealed housing 12 by means of diaphragm support 20. The airspeed diaphragm 18 is joined to Pitot pressure inlet port 16 through fluid line 22 and diaphragm support 20. The second side of airspeed diaphragm 18 is free for movement responsive to changes in Pitot pressure.

A second fluid pressure responsive element such as capsule 24 (aneroid diaphragm) is an evacuated sealed capsule. One side of the aneroid diaphragm 24 is securely mounted to the housing 12 through a supporting structure which comprises a diaphragm support 26, an overload spring 28 and a stem 30. The second side of the aneroid diaphragm 24 is free to move responsive to changes in the static pressure.

The fluid pressure responsive capsules 18 and 24 may take a variety of forms, such as a diaphragm or bellows.

Advantageously, the movable or free side of airspeed diaphragm 18 and aneroid diaphragm 24 are connected to adjustable means of any well known form, but preferably comprising adjustable linkages such as linkages 32 and 34. Adjustable linkage 32 is connected to arm 36 to which movable contacts 38 and 40 are affixed. Movable contact 42 is connected to the free side of aneroid diaphragm 24 through adjustable linkage 34 and is positioned to move in the same path of movement as contact 40. Fixed contact 44 is mounted to the housing 12 through a supporting structure which comprises a stem 46 and an overload spring 48. Fixed contact 44 is positioned in the path of movement of movable contact 38.

The device may be considered in two sections, the maximum airspeed section and the maximum Mach section. The maximum airspeed section will indicate when a predetermined maximum airspeed is reached and the maximum Mach section which will indicate when a maximum predetermined Mach number is reached by the aircraft.

In the maximum airspeed section, upon the engagement of movable contact 38 and fixed contact 44 an electrical circuit is completed, which results in the energization of relay 56. This electrical circuit comprises wire 50, contact 40, wire 52, contacts 38 and 44 and wire 54. In the maximum Mach section, upon the engagement of movable contact 40 with movable contact 42 an electrical circuit is completed which results in the energization of relay 56. This electrical circuit comprises wire 50, contacts 40 and 42 and wire 58.

Relay 56 is associated with a suitable electrical receptacle 60 which may be connected to a suitable warning device (not shown).

FIGURE II graphically presents the operational value of the inventive device. The maximum safe values of Mach number and indicated airspeed were selected for the purpose of illustration as limiting criteria for a representative aircraft, it being expressly understood that the invention is not limited thereto. The device does just as readily operate in the supersonic speed range as well as in the subsonic speed range as illustrated in the graph.

In the graph, total pressure is plotted along the abscissa and static pressure is plotted along the ordinate. Both the total and static pressures are expressed in inches of mercury. For the purpose of illustrating the invention, 0.80 Mach number and 400 knots were plotted on the graph, these two values represent the maximum Mach number and indicated airspeed for which the mechanism illustrated in FIGURE I has been preset.

The Mach and airspeed lines have defined four areas on the graph, areas A, B, C and D. The area to the right of 0.80 Mach line, areas B plus D, represents the condition in which the aircraft has exceeded 0.80 Mach number. The area to the right of the 400 knot line, areas C plus D, represents the condition in which the aircraft has exceeded 400 knots.

In operation, the device as illustrated in FIGURE I and preset for an aircraft with the limits as presented in FIGURE II will operate as follows. Electrical contacts 38 and 44 are maximum airspeed contacts and electrical contacts 40 and 42 are the maximum Mach contacts and are not engaged prior to the flight of the aircraft. When the aircraft flies at an altitude and indicated airspeed within area A then neither contacts 38 and 44 or contacts 40 and 42 will be engaged. When the aircraft is flying at an altitude and airspeed within area B then contacts 40 and 42 will be engaged and contacts 38 and 44 will be separated. When the aircraft is flying at an altitude and airspeed within area C then contacts 38 and 44 will be engaged and contacts 40 and 42 will be separated. When the aircraft is flying in area D then contacts 38 and 44 and contacts 40 and 42 will be engaged. When any of the contacts are engaged an electrical circuit is completed and relay 56 is energized resulting in the warning of the pilot that he has exceeded the preset maximum indicated airspeed and/or maximum Mach number.

The inadequacy of a warning device which would indicate either Mach number or indicated airspeed is readily apparent from FIGURE II. An aircraft which would not structurally withstand speeds in the excess of 0.80 Mach or 400 knots could not safely use an indicating device which would serve to indicate either maximum airspeed or Mach number. An aircraft which has an instrument which would indicate only maximum safe airspeed would exceed the structural limitations of the aircraft when flying at a speed less than the maximum safe airspeed and within area B of the graph, the pilot would have no indication that he has exceeded the structural limitation of the craft by flying at such speed and would be in serious difficulty. An aircraft which has an instrument which would indicate only maximum safe Mach number and such aircraft is flying within such safe Mach number, but in flying within area C has exceeded the speed at which it is safe to fly, but has no indication of this condition.

While the indicating device as shown in FIGURE I is of the construction shown and described, it is understood that the instant invention is not limited to any particular form or division. Moreover, other changes and modifications of the novel indicating device contemplated herein may be made by those skilled in the art without departing from the scope of the instant invention.

We claim:

1. A switch for activation at a predetermined indicated airspeed or Mach number, whichever is first reached, comprising a static pressure responsive capsule movable with pressure variations incident to changes in ambient pressure, dynamic pressure responsive [capsule movable] *means for producing movement* with impact pressure variations incident to changes in airspeed, first and second movable airspeed contacts carried by said dynamic pressure responsive *means* [capsule], a third non-movable contact disposed in the path of one of said movable airspeed contacts for engagement therewith when said predetermined airspeed is reached, a fourth movable Mach contact carried by said static pressure responsive capsule disposed in the path of the other of said airspeed contacts movable towards and away from said airspeed contact and disposed for engagement with said airspeed contact when said predetermined Mach number is reached.

2. The invention defined in claim 1 including means for adjusting the position of said contacts to vary the degree of separation of said contacts independently of static and Pitot pressure.

3. An electrical switch for activation at a predetermined indicated airspeed or Mach number whichever is first reached comprising a static pressure responsive capsule movable with pressure variations incident to changes in ambient pressure, a dynamic pressure responsive capsule movable with impact pressure variations incident to changes in airspeed, first and second movable electrical airspeed contacts carried by said dynamic pressure responsive capsule, a third non-movable electrical contact disposed in the path of one of said movable airspeed contacts for electrical engagement with said electrical contact when said predetermined airspeed is reached, a fourth movable electrical Mach contact carried by said static pressure responsive capsule disposed in the path of the other of said electrical airspeed contacts and movable towards and away from said electrical airspeed contact and disposed for electrical engagement with said electrical airspeed contact when said predetermined Mach number is reached.

4. The invention defined in claim 3 including means for adjusting the position of said electrical contacts to vary the degree of separation of said contacts independently of static and Pitot pressure.

5. The invention defined in claim 4 including means for receiving the signal from said electrical contact and transmitting said signal to a remote indicating device.

6. An electrical switch for activation at a predetermined maximum safe indicated airspeed or Mach number, whichever is first reached, comprising a static pressure responsive capsule movable with pressure variations incident to changes in ambient pressure, a dynamic pressure responsive capsule movable with impact pressure variations incident to changes in airspeed, first and second movable electrical airspeed contacts carried by said dynamic pressure responsive capsule, a third non-movable electrical contact disposed in the path of one of said movable airspeed contacts for electrical engagement with said airspeed contact when said maximum safe indicated airspeed is reached, a fourth movable electrical Mach contact carried by said static pressure responsive capsule disposed in the path of one of said airspeed contacts and movable towards and away from said airspeed contact and disposed for electrical engagement with said airspeed contact when said predetermined maximum safe Mach number is reached.

7. The invention defined in claim 6 including means for adjusting the position of said electrical contacts to vary the degree of separation of said contacts independently of static and Pitot pressures.

8. The invention defined in claim 7 including means for receiving the overload on said contacts.

9. A switch for activation at a predetermined indicated airspeed or Mach number, whichever is first reached, comprising a static pressure responsive capsule movable with pressure variations incident to changes in ambient pressure, dynamic pressure responsive capsule movable with impact pressure variations incident to changes in airspeed, airspeed contact means movable in response to movement by said dynamic pressure responsive capsule, a non-movable contact disposed in the path of said airspeed contact means for engagement therewith when said predetermined airspeed is reached, Mach contact means movable in response to movement by said static pressure responsive capsule disposed in the path of said airspeed contact means and movable toward and away from said airspeed contact means and disposed for engagement with said airspeed contact means when said predetermined Mach number is reached.

References Cited in the file of this patent or the original patent

UNITED STATES PATENTS

| | | |
|---|---|---|
| Re. 23,536 | Del Mar | Aug. 26, 1952 |
| 2,116,960 | Brown et al. | May 10, 1938 |
| 2,450,961 | Heymann et al. | Oct. 12, 1948 |
| 2,493,931 | Smaby | Jan. 10, 1950 |
| 2,537,474 | Mejean | Jan. 9, 1951 |
| 2,656,428 | Harris | Oct. 20, 1953 |
| 2,814,688 | Kutzler | Nov. 26, 1957 |